(12) United States Patent
Bizarria et al.

(10) Patent No.: US 11,684,191 B2
(45) Date of Patent: Jun. 27, 2023

(54) MOUNTING DEVICE AND METHOD OF SUPPORTING AN OBJECT

(71) Applicant: 3M INNOVATIVE PROPERTIES COMPANY, St. Paul, MN (US)

(72) Inventors: Felipe S. R. Bizarria, São Paulo (BR); Julio M. Souza, São Paulo (BR)

(73) Assignee: 3M Innovative Properties Company, St. Paul, MN (US)

( * ) Notice: Subject to any disclaimer, the term of this patent is extended or adjusted under 35 U.S.C. 154(b) by 51 days.

(21) Appl. No.: 17/290,303

(22) PCT Filed: Nov. 12, 2019

(86) PCT No.: PCT/IB2019/059712
§ 371 (c)(1),
(2) Date: Apr. 30, 2021

(87) PCT Pub. No.: WO2020/100036
PCT Pub. Date: May 22, 2020

(65) Prior Publication Data
US 2021/0369031 A1    Dec. 2, 2021

Related U.S. Application Data

(60) Provisional application No. 62/760,576, filed on Nov. 13, 2018.

(51) Int. Cl.
*A47G 29/08*    (2006.01)
*A47G 1/17*    (2006.01)
*F16B 47/00*    (2006.01)
*F16M 13/02*    (2006.01)

(52) U.S. Cl.
CPC ............ *A47G 29/08* (2013.01); *A47G 1/17* (2013.01); *F16B 47/003* (2013.01); *F16M 13/02* (2013.01)

(58) Field of Classification Search
CPC .. B64F 1/362; F16H 19/06; F16H 2019/0613; F16L 3/01; Y02T 50/80
USPC ........................................................ 138/106
See application file for complete search history.

(56) References Cited

U.S. PATENT DOCUMENTS

| 5,967,474 | A | 10/1999 | doCanto |
| 6,042,078 | A | 3/2000 | Donovan |
| 8,844,886 | B2 | 9/2014 | Mejia |
| 2001/0028022 | A1 | 10/2001 | Hamerski |

(Continued)

FOREIGN PATENT DOCUMENTS

| CN | 104970673 | 10/2010 |
| CN | 203016602 | 6/2013 |

(Continued)

OTHER PUBLICATIONS

International Search Report for PCT International Application No. PCT/IB2019/059712, dated Jan. 20, 2020, 4 pages.

*Primary Examiner* — Muhammad Ijaz
(74) *Attorney, Agent, or Firm* — Ann K. Gallagher

(57) ABSTRACT

Disclosed are mounting devices that allow consumers to quickly and easily determine whether a given mounting device can be used to hang or otherwise support a desired object. The mounting device includes an indicator that is exposed to alert the consumer if the weight of the object exceeds the maximum weight recommendation of the mounting device. If the indicator remains hidden, the mounting device is considered appropriate for the given object.

17 Claims, 12 Drawing Sheets

(56) References Cited

U.S. PATENT DOCUMENTS

| | | | |
|---|---|---|---|
| 2006/0124811 A1 | 6/2006 | Tatarsky | |
| 2007/0257165 A1* | 11/2007 | Newbould | A47G 1/175 248/205.3 |
| 2011/0174940 A1* | 7/2011 | Cai | A47G 23/0208 248/205.3 |
| 2012/0126078 A1* | 5/2012 | Gonciarz | A47G 25/0607 248/224.8 |
| 2018/0291947 A1* | 10/2018 | Demsky | C09J 7/40 |

FOREIGN PATENT DOCUMENTS

| | | |
|---|---|---|
| CN | 203195373 | 9/2013 |
| CN | 203341484 | 12/2013 |
| CN | 203749134 | 8/2014 |
| CN | 204232826 | 4/2015 |
| CN | 105747810 | 7/2016 |
| JP | 3544511 | 7/2004 |
| JP | 4684276 | 5/2011 |
| JP | 4695030 | 6/2011 |
| JP | 4737767 | 8/2011 |
| JP | 4949065 | 6/2012 |
| JP | 5330186 | 10/2013 |
| WO | WO 1994-021157 | 9/1994 |
| WO | WO 2019-077501 | 4/2019 |

\* cited by examiner

MOUNTING DEVICE AND METHOD OF SUPPORTING AN OBJECT

CROSS REFERENCE TO RELATED APPLICATIONS

This application is a national stage filing under 35 U.S.C. 371 of PCT/IB2019/059712, filed 12 Nov. 2019, which claims the benefit of U.S. Provisional Application No. 62/760,576, filed 13 Nov. 2018, the disclosures of which are incorporated by reference in their entireties herein.

TECHNICAL FIELD

The present disclosure relates generally to mounting devices, and more specifically to a mounting device and a method of supporting an object from a substrate.

BACKGROUND

Mounting devices, such as Command® utility hooks, are generally used to support an object from a substrate. Such mounting devices typically include an adhesive strip, a base, and a cover. The adhesive strip, such as a Command® adhesive strip, is attached to the base. The Command® adhesive strips are a line of stretch removable adhesive strips that hold strongly on a variety of substrates (including paint, wood, and tile). In general, the stretch removable adhesive strips include a layer of adhesive composition disposed on a surface of a backing, such as a tape. Stretch removable adhesive strips include high performance pressure-sensitive adhesive composition that combines strong holding power with clean removal and no surface damage. The clean removal aspect means that a tacky and/or unsightly residue is not left behind on the substrate after removal of the stretch removable adhesive strip and that no damage to the substrate occurs during the removal process. During the process of stretch removal, the adhesive layer typically remains adhered to the backing surface as the backing is stretched, but releases from the substrate (i.e., adherend).

The mounting devices are commonly provided in packaging that includes a printed maximum weight recommendation for objects that ought to be supported by the mounting devices. This so-called package weight claim is designed to alert consumers to the expected performance of the mounting article. Moreover, the package weight claim is intended to help the consumer avoid unnecessary damage to both possessions and wall surfaces. However, when a mounting device is already installed, it may be difficult for a consumer to know the weight claim for that particular model as the package weight claim information is typically discarded after installation. In such cases, the consumer may have to search on internet and compare weight measurements with an equivalent model, which is time consuming. Further, consumers do not always have a scale or other weighing machine available to check the weight of the object to be supported. Thus, it is challenging for the consumer to speculate if the weight of the object lies within the package weight claim of the mounting device.

SUMMARY

Though a variety of mounting devices exist and provide myriad options for supporting objects of different weights, it is often challenging for a consumer to select an appropriate mounting device for a given object. While many mounting devices are displayed in packages with a printed maximum weight recommendation, the consumer is often left to speculate on a weight of the object to be mounted and may need to test multiple mounting devices before success. This testing can result in wastage of time, as well as potential damage to substrates if the mounting device fails.

The inventors of the present disclosure realized that consumers needed a convenient way to test the suitability of a mounting device for any object to be supported. The mounting devices of the present disclosure allow consumers to quickly and easily determine whether a given mounting device can be used to hang or otherwise support a desired object. The mounting device includes an indicator that is exposed to alert the consumer if the weight of the object exceeds the maximum weight recommendation of the mounting device. Thus, when supporting an object on the mounting device, the indicator provides an indication whether or not the mounting device can support the weight of the object. Accordingly, the mounting device of the present disclosure provides a clear and unmistakable confirmation that the consumer is supporting an object having a correct weight from the mounting device.

In one aspect, the present disclosure provides a mounting device for supporting an object from a substrate, the mounting device including: a base attachable to the substrate and defining an upper end and a lower end, the base including an indicator at the upper end; a cover movably connected to the base, the cover including a support for supporting the object, wherein the cover covers the indicator of the base at a normal position with respect to the base; and a resilient member disposed between the base and the cover, wherein the resilient member is adapted to retain the cover at the normal position up to a predetermined weight threshold applied on the support; wherein the cover moves from the normal position to at least partially expose the indicator when a weight applied on the support exceeds the predetermined weight threshold.

In another aspect, the present disclosure provides a method of supporting an object from a substrate, the method including: providing a mounting device including a base, a cover movably connected to the base, and a resilient member disposed between the base and the cover, wherein: the base defines an upper end and a lower end, the base including an indicator at the upper end; the cover covers the indicator at a normal position with respect to the base; and the resilient member is adapted to retain the cover at the normal position up to a predetermined weight threshold applied on a support projecting outwards from the cover. The method further includes attaching the base to the substrate; and supporting the object on the support, wherein the cover moves from the normal position to at least partially expose the indicator when a weight applied on the support exceeds the predetermined weight threshold, at least partial exposure of the indicator being indicative of the object being too heavy for a recommended use of the mounting device.

In another aspect, the present disclosure provides a mounting device for supporting an object from a substrate, the mounting device including: a base defining an upper end and a lower end, the base including an indicator at the upper end; an adhesive strip adapted to attach the base to the substrate; a cover movably connected to the base, the cover including a support for supporting the object, wherein the cover covers the indicator of the base at a normal position with respect to the base; and a resilient member disposed between the base and the cover, wherein the resilient member is adapted to retain the cover at the normal position up to a predetermined weight threshold applied on the support, and wherein the resilient member is compressed to move the cover from the normal position when a weight applied on the support exceeds the predetermined weight threshold, the indicator being at least partially exposed upon movement of the cover from the normal position.

As used herein, "layer" means a single stratum that may be continuous or discontinuous over a surface.

As used herein, the terms, "height", "depth", "top" and "bottom" are for illustrative purposes only, and do not necessarily define the orientation or the relationship between the surface and the intrusive feature.

Accordingly, the terms "height" and "depth", as well as "top" and "bottom" should be considered interchangeable.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As recited herein, all numbers should be considered modified by the term "about".

As used herein, "a", "an", "the", "at least one", and "one or more" are used interchangeably. Thus, for example, a backing card comprising "a" projection can be interpreted as a backing card comprising "one or more" projections.

Also herein, the recitations of numerical ranges by endpoints include all numbers subsumed within that range (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exhaustive list.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure is presented by way of representation and not limitation. It should be understood that numerous other modifications and embodiments can be devised by those skilled in the art, which fall within the scope and spirit of the principles of the disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The mounting devices of the present disclosure allow consumers to quickly and easily determine whether a given mounting device should be used to hang or otherwise support a desired object. The mounting devices include an indicator that is exposed if an object exceeding a predetermined weight threshold is supported on the mounting device. When the indicator is exposed, then another mounting device should be sought, or the weight should be reduced. If the indicator remains hidden, the mounting device is considered appropriate for the given object. Accordingly, the mounting device of the present disclosure provides a clear and unmistakable confirmation that the consumer is supporting an object having a correct weight from the mounting device. The mounting device described herein improves system reliability and customer satisfaction, as well as likely reducing the number of complaints regarding failure of mounting devices due to overloading.

Figure 1:
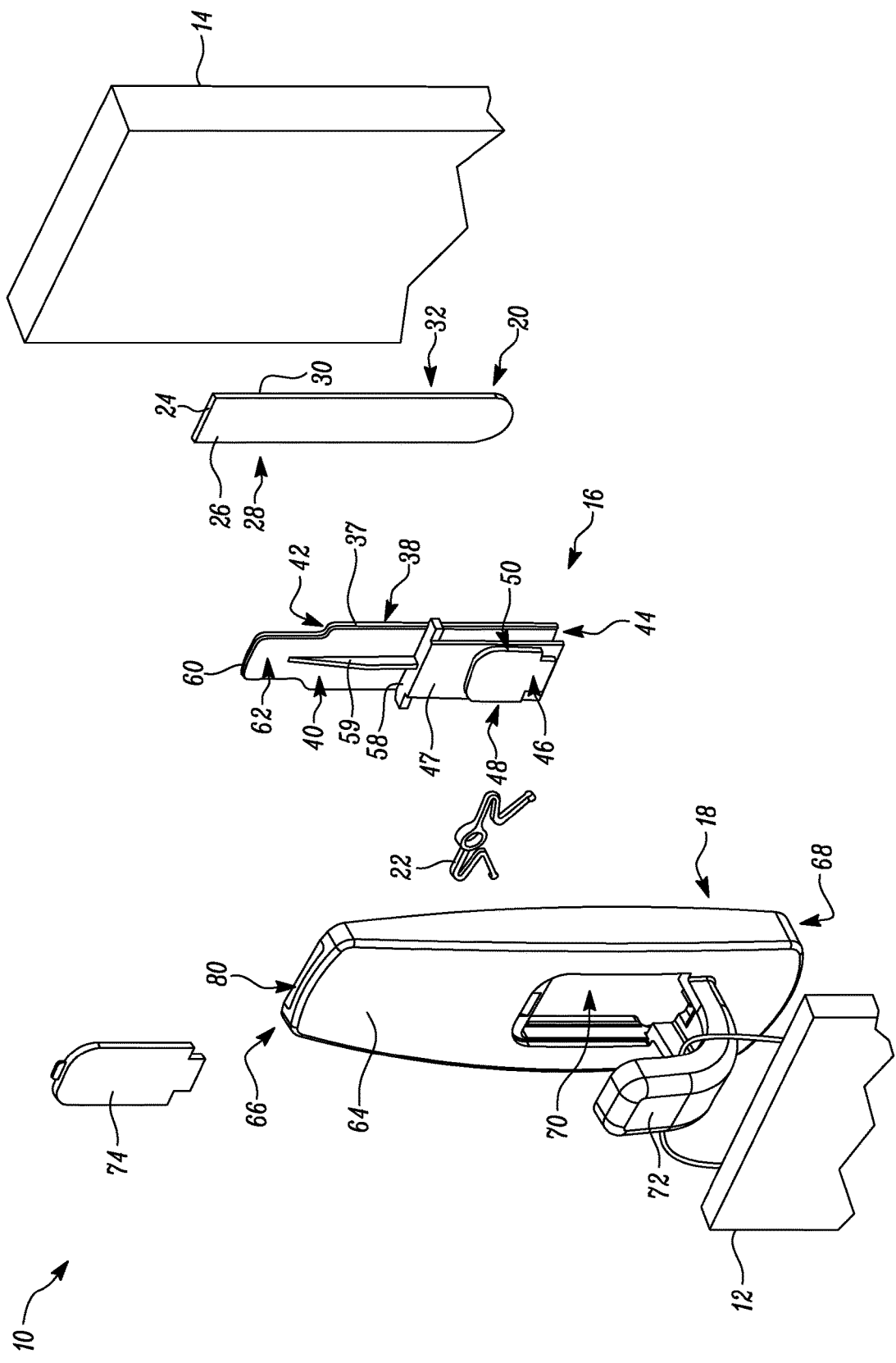
FIG. 1 is an exploded view of a mounting device according to one embodiment of the present disclosure.
Figure 2:
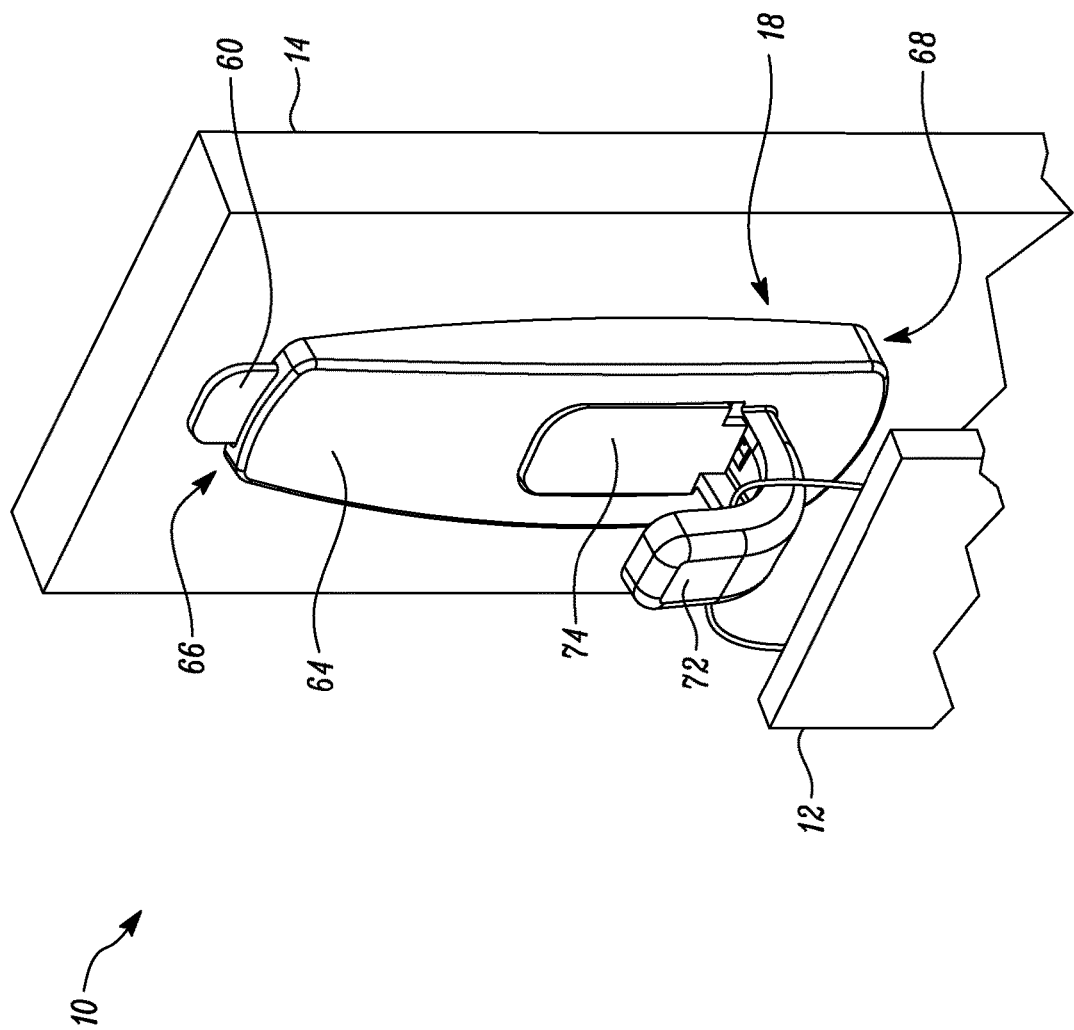
FIG. 2 is a perspective view of the mounting device of FIG. 1 according to one embodiment of the present disclosure.

FIGS. 1 and 2 illustrate the mounting device 10 for supporting the object 12 from a substrate 14. In the illustrated example, the substrate 14 is a wall. However, the substrate 14 may include any other surface such as that of an appliance, a cabinet, a machine, a vehicle, and the like. Also, the substrate 14 may include a painted surface, a wooden surface, a plastic surface, a ceramic surface, etc. Further, the object 12 shown herein is a frame, however, the object 12 may include any household accessory or an accessory that is used in an industrial application, without any limitations.

Referring to FIG. 1, the mounting device 10 includes a base 16, a cover 18, an adhesive strip 20, and a resilient member 22. The base 16 is attachable to the substrate 14 using the adhesive strip 20. In some embodiments, the adhesive strip 20 is a stretch removable adhesive strip that can adhere strongly to a variety of substrates. For example, the adhesive strip 20 may be a Command® Adhesive Strip manufactured by 3M Company. Alternatively, the adhesive strip 20 may include any other double-sided adhesive tape, without any limitations. In other alternatives, the adhesive strip is integral with the base 16, such that the rear surface of the base 16 includes an exposed adhesive surface.

The adhesive strip 20 includes a backing member 24. The backing member 24 may include, for example, a film, a foam, an adhesive layer, or combinations thereof. The adhesive strip 20 also includes a first layer of adhesive composition 26 disposed on a first side 28 of the backing member 24 and a second layer of adhesive composition 30 disposed on a second side 32 of the backing member 24. The first layer of adhesive composition 26 attaches the backing member 24 to the base 16 and the second layer of adhesive composition 30 attaches the backing member 24 to the substrate 14. Each of the first and second layers of adhesive composition 26, 30 are covered by a release liner (not shown) respectively to avoid adherence of the first and second layers of adhesive composition 26, 30 with undesired surfaces. Further, the first and second layers of adhesive composition 26, 30 may include pressure-sensitive adhesive composition. It should be further noted that the base 16 may be attached to the substrate 14 using other adhesives or fasteners. For example, the base 16 may be attached to the substrate 14 using mechanical fasteners, such as bolts or screws. Alternatively, a hook and loop fastener or a suction mount may also be used to attach the base 16 with the substrate 14, without any limitations.

Figure 3:
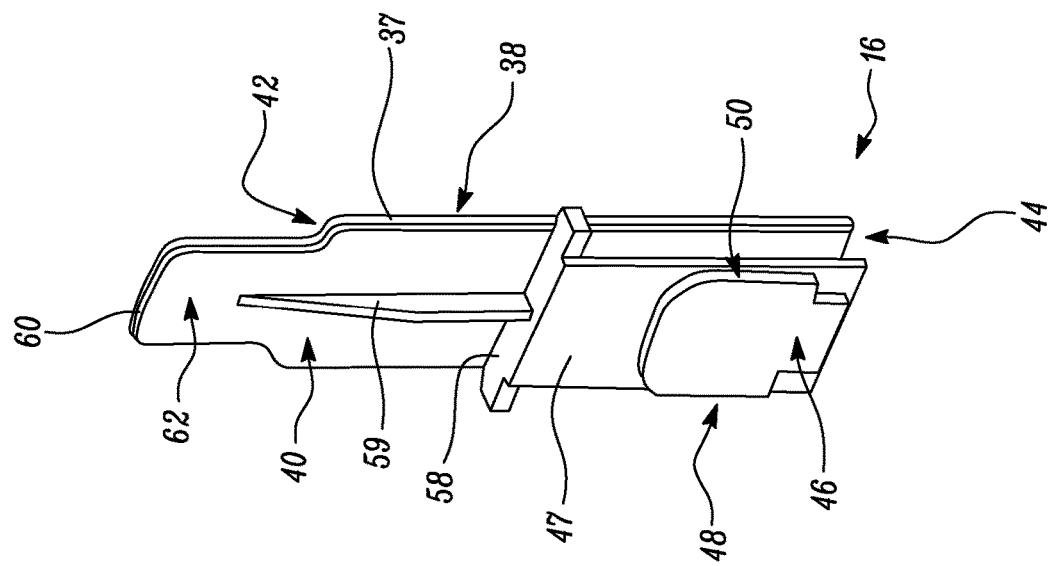
FIG. 3 is a perspective view of a base of the mounting device of FIG. 1 according to one embodiment of the present disclosure.

As shown in FIGS. 1 and 3, the base 16 includes a first plate 37 that is generally rectangular in shape. The first plate 37 defines a rear surface 38 and a front surface 40 disposed opposite to the rear surface 38. The rear surface 38 may be a generally planar surface that contacts the first layer of adhesive composition 26 for attaching the backing member 24 with the adhesive strip 20. Further, the base 16 defines an upper end 42 and a lower end 44. The first plate 37 may be a continuous plate extending between the upper and lower ends 42, 44. The base 16 includes a connecting portion 46 disposed proximate to the lower end 44 of the base 16. The connecting portion 46 extends outwards from a second plate 47 of the base 16. The second plate 47 may be substantially parallel to the first plate 37. The connecting portion 46 defines a first rib 48 and a second rib 50 located distal to the first rib 48. Additionally, the base 16 includes a ledge 58 that extends outwards from the front surface 40 of the first plate 37 and includes a surface that lies in a plane generally perpendicular to the front surface 40. The ledge 58 is embodied as a generally rectangular plate and is located between the upper and lower ends 42, 44. The ledge 58 is further connected to the second plate 47. Further, a support rib 59 extends from the front surface 40 for strengthening the base 16.

The base 16 also includes an indicator 60 disposed at the upper end 42 of the base 16. While the indicator 60 is configured to be initially obscured by the cover 18 on assembly as further described below, the exposure of the indicator 60 notifies a consumer that a weight of the object 12 applied on the mounting device 10 is greater than the predetermined weight threshold of the mounting device 10. The predetermined weight threshold may be approximately equal to a package weight claim that the mounting device 10 can support without breaking or failing. In some cases, some amount of tolerance in terms of weight may exist between the predetermined weight threshold and the package weight claim. For example, the predetermined weight threshold may be greater than the package weight claim. The package weight claim may be printed on a package (not shown) that contains the mounting device 10 to alert consumers regarding the expected performance of the mounting device 10. In some cases, the mounting device 10 may support an excess weight up to 500 grams above the package weight claim specified on the package and for a time equal to or less than 30 seconds.

The indicator 60 extends vertically upwards from the upper end 42 of the base 16. Specifically, the indicator 60 extends from the first plate 37. The indicator 60 is substantially rectangular in shape. However, the indicator 60 may include any other shape, without any imitations. The indicator 60 is integral with the base 16 and includes a surface 62 having an appearance distinct from a cover 18. In one example, the surface 62 may have a color that is different from a color of the cover 18. For example, the surface 62 may have a red color whereas the cover 18 may be white in color thereby differentiating the indicator 60 from the cover 18. In another example, the surface 62 may include text that differentiates the indicator 60 from the cover 18. For example, the surface 62 may include text such as "overload" or "overweight" to indicate that the weight of the object 12 is greater than the predetermined weight threshold of the mounting device 10. In yet another example, the surface 62 may include a texture that is different from the texture of the cover 18. Further, the indicator 60 may include a shape that is distinct from a shape of the cover 18 so that the consumer can identify an exposure of the indicator 60 in a situation where the weight of the object 12 is greater than the predetermined weight threshold of the mounting device 10.

The mounting device 10 also includes the cover 18. The cover 18 includes a first surface 64, a second surface 52 disposed opposite to the first surface 64, an upper end 66, and a lower end 68. Further, the cover 18 is movably connected to the base 16. The cover 18 includes an opening 70 provided adjacent to a support 72. The opening 70 is covered by a cap 74. A shape of the cap 74 corresponds to a shape of the opening 70. In one example, the cap 74 may be snap-fit to the cover 18 for covering the opening 70. While the cooperation of the opening 70 and cap 74 may assist in manufacturing and assembly of the mounting device 10, neither is strictly necessary for the mounting device 10 to function as described herein.

Figure 4:
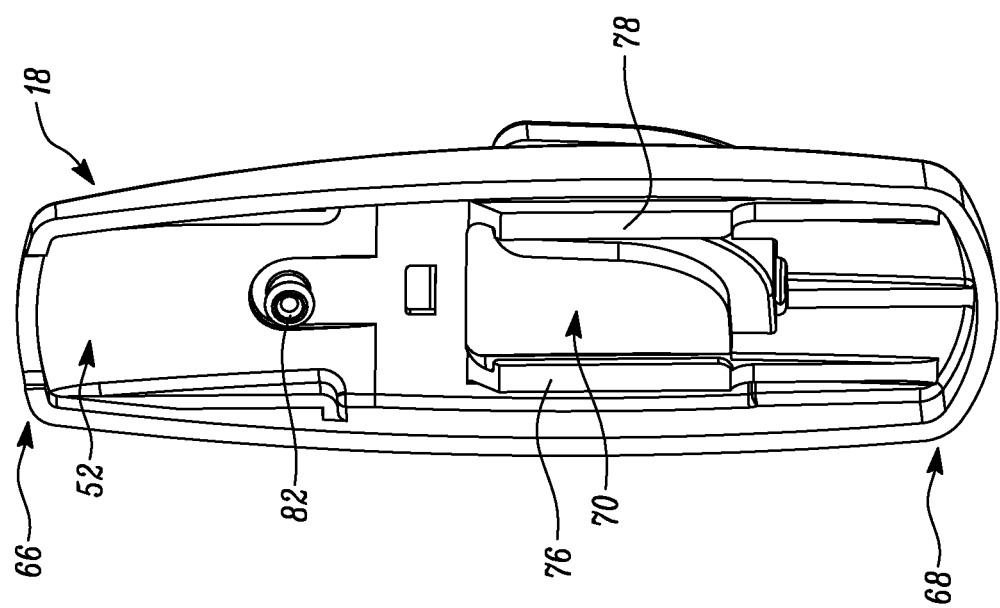
FIG. 4 is a rear perspective view of a cover associated with the mounting device of FIG. 1 according to one embodiment of the present disclosure.

Referring to FIG. 4, the cover 18 includes a pair of channels, namely a first channel 76 and a second channel 78 extending over the second surface 52. The first rib 48 (see FIG. 1) of the connecting portion 46 is slidably received within the first channel 76 of the base 16 (see FIG. 1) for movably connecting the cover 18 to the base 16. Further, the second rib 50 (see FIG. 1) of the connecting portion 46 is slidably received within the second channel 78 of the base 16 for movably connecting the cover 18 to the base 16. The cover 18 also includes a projection 82 provided at the second surface 52 of the cover 18. The projection 82 may have a circular cross-section. The projection 82 extends outwards from the second surface 52 of the cover 18. As shown, the projection 82 is provided proximate to the upper end 66 of the cover 18. In some embodiments, the projection 82 has a non-uniform width. The projection 82 has a wide portion distal to the second surface 52 and a narrow portion adjacent to the second surface 52.

As shown in FIG. 1, the mounting device 10 also includes a resilient member 22. The resilient member 22 is disposed between the base 16 and the cover 18. In a normal or an uncompressed state of the resilient member 22, the resilient member 22 retains the cover 18 at the normal position up to the predetermined weight threshold applied on the support 72. As the weight of the object 12 applied on the support 72 increases, the cover 18 moves with respect to the base 16 against a resistance of the resilient member 22. This movement of the cover 18 compresses the resilient member 22 to allow movement of the cover 18 from a normal position when the weight applied on the support 72 exceeds the predetermined weight threshold. The resilient member 22 is compressed to move the cover 18 from the normal position when the weight applied on the support 72 exceeds the predetermined weight threshold. More particularly, the resilient member 22 is in a compressed state when the cover 18 is at a loaded position. Further, when the excess weight applied on the support 72 is removed, the resilient member 22 expands in order to move the cover 18 back to the normal position. Other suitable resilient members include coil springs, leaf springs, Belleville washers, multi-diameter springs, bifurcating springs, and like stored energy devices.

Figure 6:
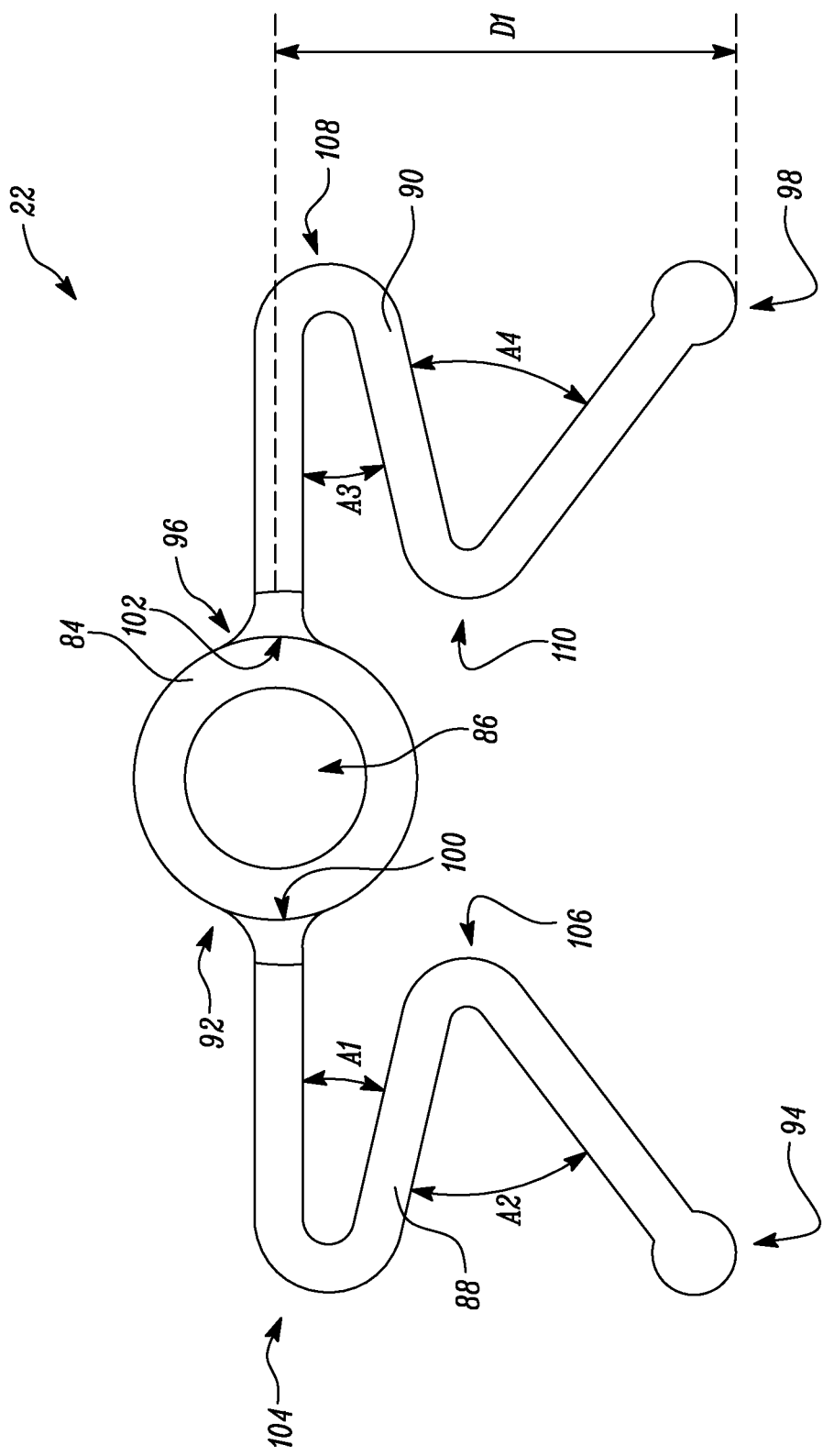
FIG. 6 illustrates a front view of a resilient member associated with the mounting device of FIG. 1 according to various embodiments of the present disclosure.

The resilient member 22 described herein is used when the predetermined weight threshold lies approximately between 2.3 kilograms (kg) and 2.8 kg. Referring to FIG. 6, the resilient member 22 includes a central body 84 defining a hole 86. As illustrated, the central body 84 is embodied as an annular ring. In an assembled condition of the mounting device 10, the hole 86 is received within the projection 82 (see FIG. 4) of the cover 18. In some embodiments, the central body 84 is received on the narrow portion of the projection 82. The wide portion of the projection 82 may secure the central body 84 on the projection 82. The resilient member 22 also includes a pair of arms, namely a first arm 88 and a second arm 90, extending from the central body 84. The first and second arms 88, 90 are compressed to move the cover 18 from the normal position when the weight applied on the support 72 (see FIG. 1) exceeds the predetermined weight threshold.

The first arm 88 includes a first end 92 and a second end 94. Further, the second arm 90 includes a third end 96 and a fourth end 98. The first and third ends 92, 96 of the respective first and second arms 88, 90 are attached to the central body 84. In the illustrated embodiment, the first end 92 is connected at a first point of contact 100 defined on the central body 84 and the third end 96 is connected at a second point of contact 102 defined on the central body 84. It should be noted that the second point of contact 102 is located diametrically opposite to the first point of contact 100, however, this arrangement is not critical and other loci of the points of contact are within the scope of the present disclosure. Further, in the assembled state of the mounting device 10, the second and fourth ends 94, 98 of the respective first and second arms 88, 90 are received adjacent to the ledge 58 (see FIG. 1) of the base 16 (see FIG. 1). More particularly, the second and fourth ends 94, 98 contact the ledge 58. The first and second arms 88, 90 are supported by the ledge 58. The resilient member 22 is therefore retained between the projection 82 and the ledge 58.

The first arm 88 defines two bends, namely a first bend 104 and a second bend 106. In the uncompressed state of the resilient member 22, a first angle "A1" defined by the first bend 104 is different from a second angle "A2" defined by the second bend 106. Further, the second arm 90 defines two bends, namely a third bend 108 and a fourth bend 110. In the uncompressed state of the resilient member 22, a third angle "A3" defined by the third bend 108 is different from a fourth angle "A4" defined by the fourth bend 110. In some examples, when the resilient member 22 is in the uncompressed state, the first angle "A1" defined by the first bend 104 is substantially equal to the third angle "A3" defined by the third bend 108. Further, in some examples, when the resilient member 22 is in the uncompressed state, the second angle "A2" defined by the second bend 106 is substantially equal to the fourth angle "A4" defined by the fourth bend 110. The bends 104, 106, 108, 110 facilitate compression of the resilient member 22. More particularly, the bends 104, 106, 108, 110 allow smooth and easy transition of the cover 18 between the normal and loaded positions. Further, the bends 104, 106, 108, 110 may provide sufficient support for the normal position even when the object 12 is applied on the support 72. Further, a distance "D1" is defined between the second point of contact 102 and the second end 98. The distance "D1" is same as a distance defined between the first point of contact 100 and the first end 94 of the resilient member 22. In some cases, the predetermined threshold weight of the mounting device 10 may depend upon the distance "D1".

Figure 5B:
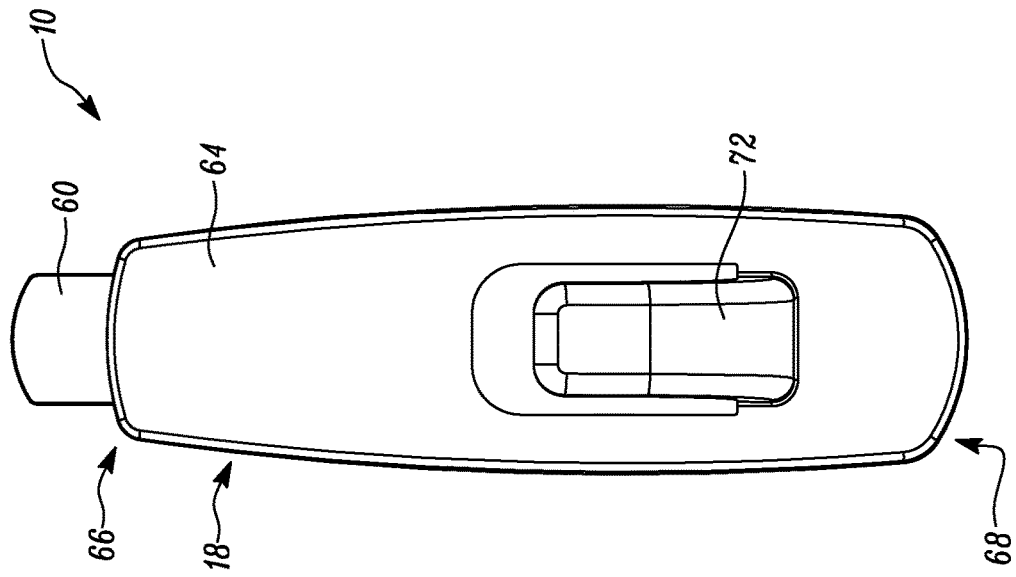
FIGS. 5A and 5B are front views of the mounting device of FIG. 1 at a normal position and a loaded position, respectively, according to one embodiment of the present disclosure.
Figure 5A:
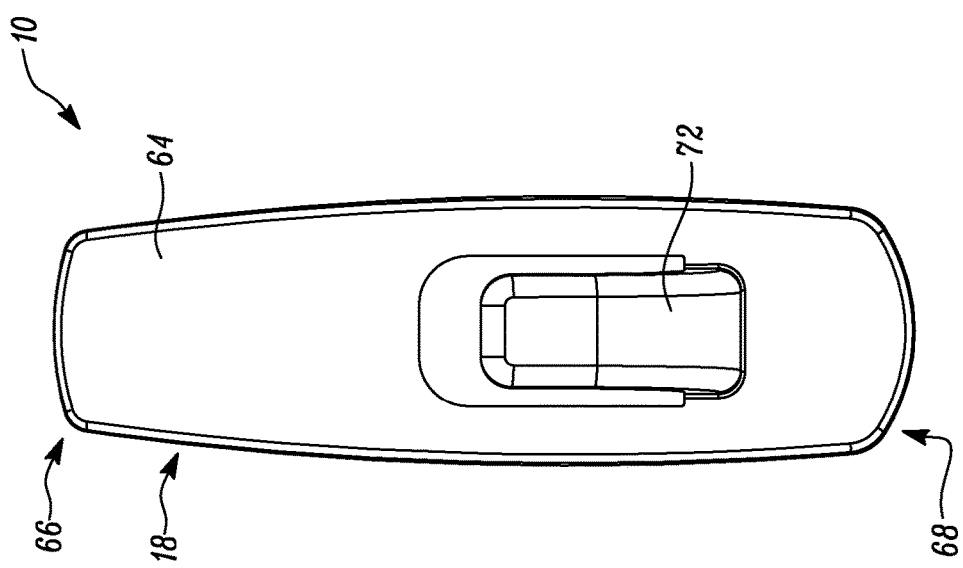

As shown in FIGS. 1 and 5A, the cover 18 includes the support 72 for supporting the object 12. The support 72 projects outwards from the front surface 64 of the cover 18. The support 72 is provided proximate to the lower end 68 of the cover 18. In the illustrated example, the support 72 is a hook extending from the cover 18. Alternatively, the support 72 may include a ring, a bracket, and the like. The cover 18 is movable relative to the base 16 between the normal position, where the indicator 60 is obscured or generally not visible, and a loaded position where the indicator 60 is at least partially exposed, each based on the weight of the object 12 applied on the support 72. The cover 18 is shown in the normal position in FIG. 7A. The cover 18 is said to be in the normal position when the weight of the object 12 applied on the support 72 is within the predetermined weight threshold (or no weight is applied to the support 72). In other words, the cover 18 is in the normal position when the weight of the object 12 is less than or equal to the predetermined weight threshold. The cover 18 covers the indicator 60 of the base 16 at the normal position with respect to the base 16.

Figure 7C:
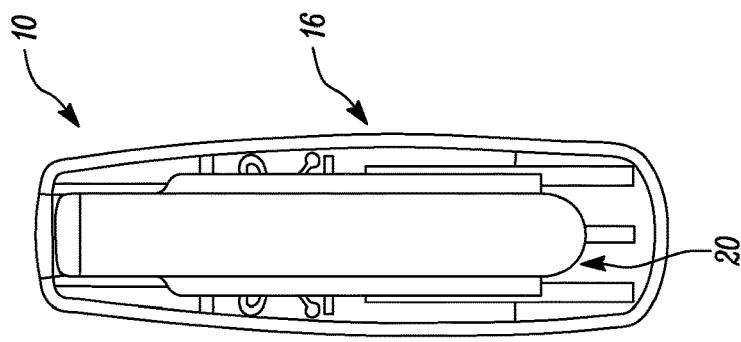
FIGS. 7A, 7B, and 7C illustrate steps for assembling the mounting device of FIG. 1 according to one embodiment of the present disclosure.
Figure 7B:
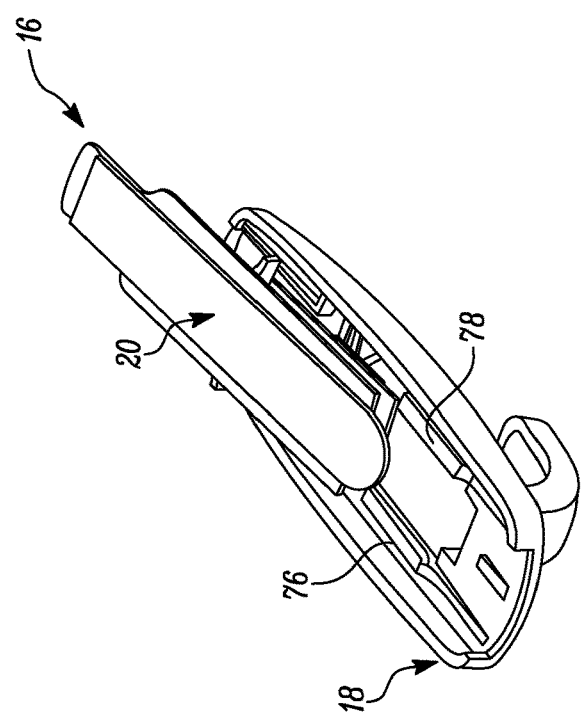

As shown in FIGS. 2 and 7B, when the weight applied on the support 72 exceeds the predetermined weight threshold, the cover 18 moves from the normal position to at least partially expose the indicator 60. The cover 18 may partially or fully expose the indicator 60 based on an excess weight applied on the support 72. The excess weight may be generally equal to a difference between the weight of the object 12 and the predetermined weight threshold. More particularly, when the weight of the object 12 applied on the support 72 is greater than the predetermined weight threshold, the cover 18 moves to the loaded position. Accordingly, the cover 18 slides with respect to the base 16 to partially or fully expose the indicator 60 of the base 16 (see FIG. 1). The cover 18 also includes a recess 80 (see FIG. 1) at the upper end 66 of the cover 18. The recess 80 is arranged to receive and guide the indicator 60 of the base 16 when the cover 18 moves from the normal position to the loaded position. A shape and size of the recess 80 may vary based on a shape and size of the indicator 60. It should be noted that the cover 18 and the base 16 may be made of similar or different materials. In one example, the cover 18 and the base 16 may be made from plastic, metal, or composite, without any limitations.

Figure 7A:
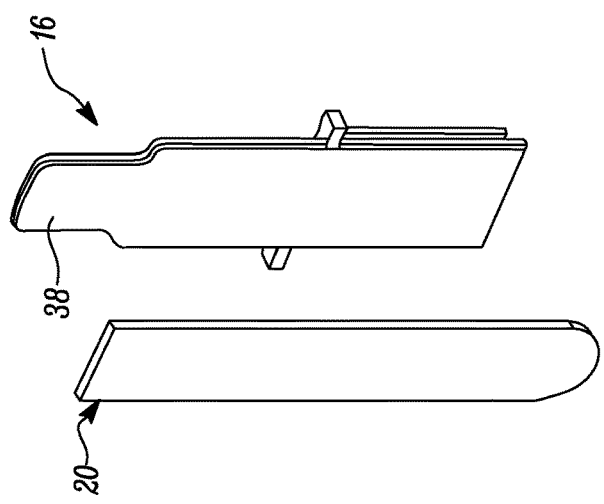

An assembly process of the mounting device 10 will now be explained with reference to FIGS. 7A, 7B, and 7C. As shown in FIG. 7A, in order to attach the adhesive strip 20 to the base 16, the adhesive strip 20 is aligned and placed on the rear surface 38 of the base 16 such that the first layer of adhesive composition 26 contacts the rear surface 38. Further, the adhesive strip 20 is pressed so that the adhesive strip 20 is evenly attached to the base 16. Referring now to FIG. 7B, the base 16 is movably connected to the cover 18 by inserting the base 16 in the cover 18. More particularly, the first rib 48 (see FIG. 1) of the base 16 is aligned with the first channel 76 of the cover 18 and the second rib 50 (see FIG. 1) of the base 16 is aligned with the second channel 78 of the cover 18 for inserting the base 16 in the cover 18. The first and second ribs 48, 50 are made to slide within the first and second channels 76, 78 until reaching the terminal end of the respective channel 76, 78, such that each rib 48, 50 is substantially within the respective channel 76, 78. This orientation positions the lower end 44 of the base 16 proximate to the lower end 68 of the cover 18 and the indicator 60 within or adjacent the recess 80. Referring now to FIG. 7C, a rear view of the assembled mounting device 10 is illustrated. The assembled mounting device 10 can be attached to the substrate 14 by first peeling off a release liner, if present, attached to the second layer of adhesive composition 30 (see FIG. 1) to expose the second layer of adhesive composition 30. The second layer of adhesive composition 30 is then attached to the substrate 14 (see FIG. 1) thereby allowing attachment of the mounting device 10 to the substrate 14.

Figure 8:
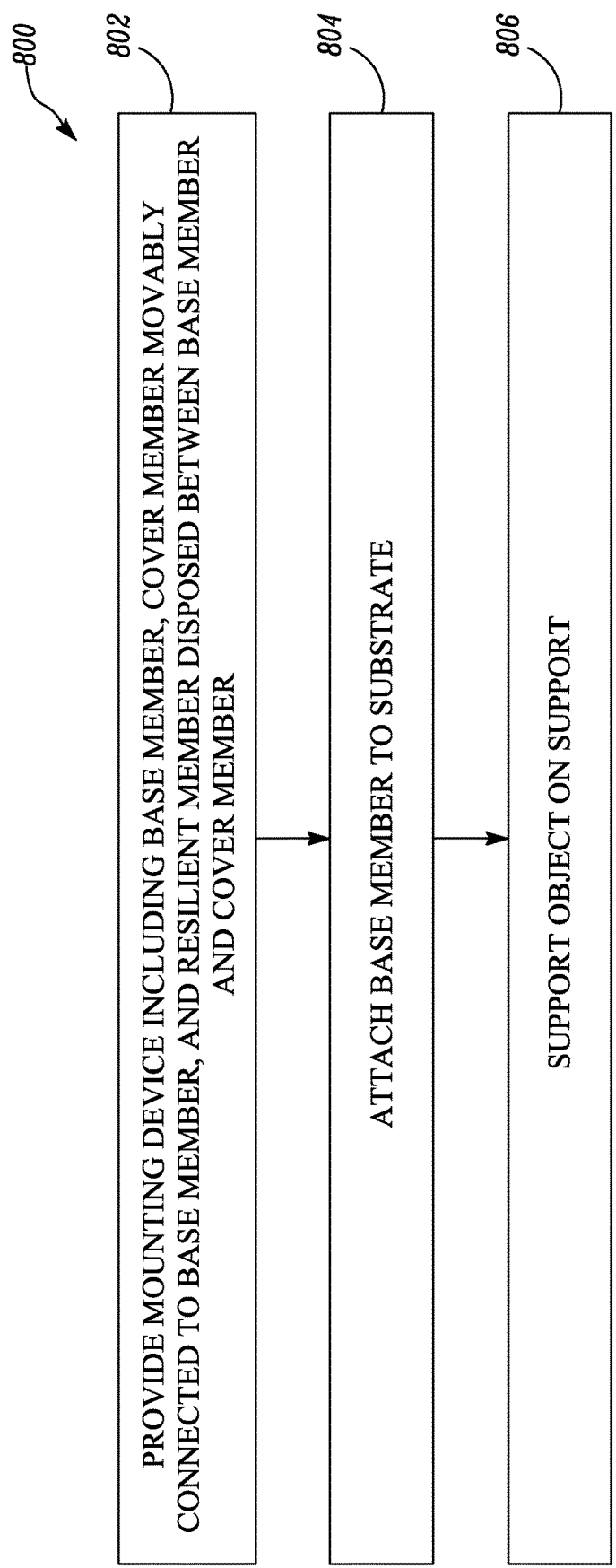
FIG. 8 is a flowchart for a method of supporting an object from a substrate using the mounting device of FIG. 1 according to one embodiment of the present disclosure.

FIG. 8 illustrates a flowchart for a method 600 of supporting the object 12 (see FIG. 1) from the substrate 14 (see FIG. 1) using the mounting device 10 (see FIGS. 5A and 5B). At step 602, the mounting device 10 is provided. As mentioned above, the mounting device 10 includes the base 16 (see FIG. 1), the cover 18 (see FIG. 1) movably connected to the base 16, and the resilient member 22 (see FIG. 1) disposed between the base 16 and the cover 18. The resilient member 22 retains the cover 18 at the normal position up to the predetermined weight threshold applied on the support 72 (see FIG. 1). At step 604, the base 16 is attached to the substrate 14. More particularly, the base 16 is attached to the substrate 14 by attaching the adhesive strip 20 (see FIG. 1) to the base 16 and the substrate 14.

Figure 9C:
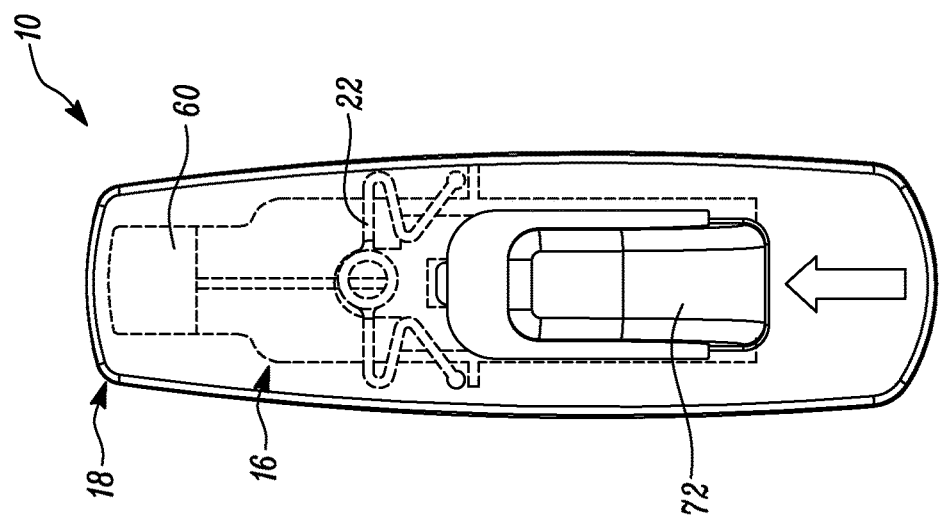
FIGS. 9A, 9B, and 9C are front views of the mounting device of FIG. 1 illustrating a transition of the mounting device between the loaded position and the normal position according to one embodiment of the present disclosure.
Figure 9B:
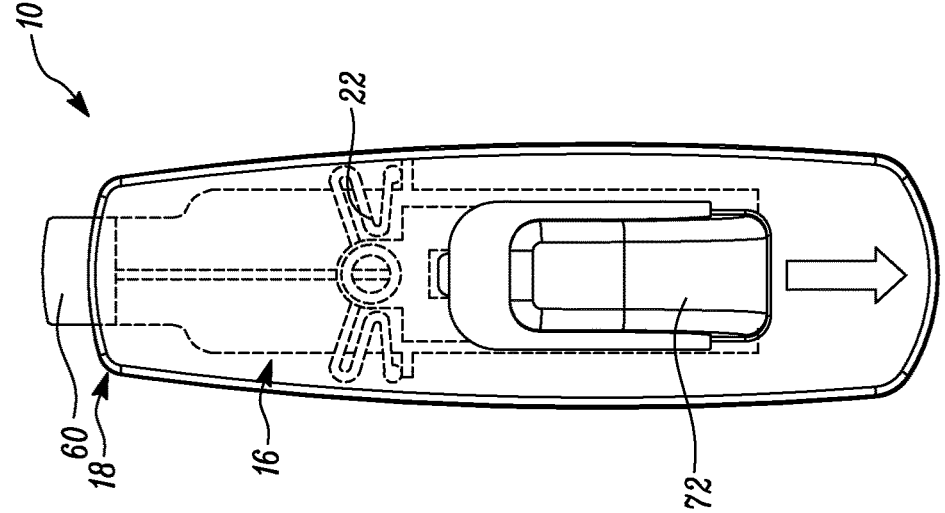
Figure 9A:
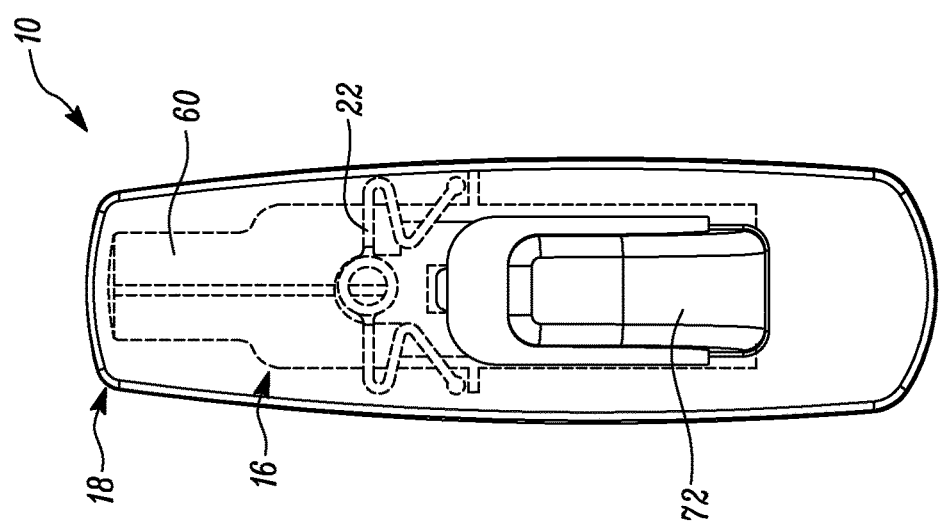

At step 606, the object 12 is supported on the support 72 of the cover 18. As shown in FIG. 9A, if the weight applied by the object 12 (see FIG. 1) on the support 72 is less than or equal to the predetermined weight threshold, the indicator 60 is covered by the cover 18. Further, the resilient member 22 remains in the uncompressed state and the cover 18 remains in the normal position. Referring to FIG. 7B, when the weight applied on the support 72 exceeds the predetermined weight threshold, the cover 18 moves from the normal position to at least partially expose the indicator 60. More particularly, the amount of downward force on the support 72 exceeds the resistance provided by resilient member 22, causing the cover 18 to move with respect to the base 16 and compressing the resilient member 22. In such a situation, the cover 18 is said to be in the loaded position and the resilient member 22 is in the compressed state.

It should be noted that, in some situations, the indicator 60 may be fully exposed, based on the amount of weight applied on the support 72. Further, the partial or full exposure of the indicator 60 is indicative of the object 12 being too heavy for a recommended use of the mounting device 10. The term "recommended use" mentioned herein may be defined in terms of the package weight claim of the mounting device 10 or the predetermined weight threshold. Further, as shown in FIG. 9C, in response to the indication of the excess weight, the weight applied on the support 72 may be reduced or removed such that the cover 18 moves back to the normal position and covers the indicator 60 of the base 16. More particularly, when the weight applied on the support 72 is reduced, the resilient member 22 returns to its uncompressed state, thereby causing the cover 18 to move back to the normal position.

Figure 10:
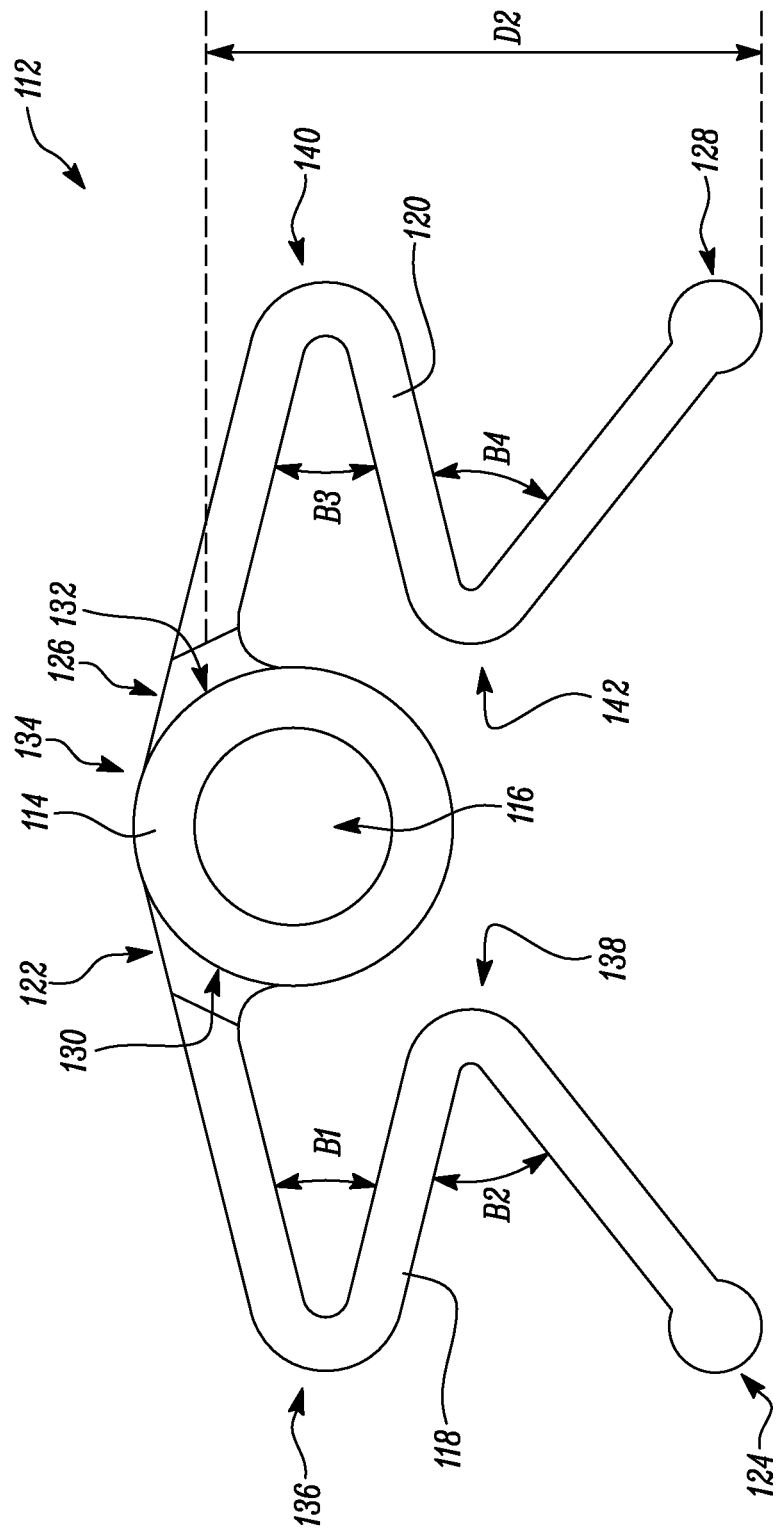
FIG. 10 illustrates a front view of another design of a resilient member associated with the mounting device of FIG. 1 according to one embodiment of the present disclosure.

FIG. 10 illustrates another design of the resilient member 112. The resilient member 112 described herein can be used when the predetermined weight threshold lies approximately between 1.3 kg and 1.8 kg. The resilient member 112 is similar in operation to the resilient member 22 described in relation to FIG. 6. The resilient member 112 includes a central body 114 defining a hole 116. As illustrated, the central body 114 is embodied as an annular ring. In the assembled condition of the mounting device 10, the hole 116 is received within the projection 82 (see FIG. 4) of the cover 18 (see FIG. 4). In some embodiments, the central body 114 is received on the narrow portion of the projection 82. The wide portion of the projection 82 may secure the central body 114 on the projection 82. The resilient member 112 also includes a pair of arms, namely a first arm 118 and a second arm 120, extending from the central body 114. The first and second arms 118, 120 are compressed to move the cover 18 from the normal position when the weight applied on the support 72 (see FIG. 1) exceeds the predetermined weight threshold.

The first arm 118 defines a first end 122 and a second end 124. Further, the second arm 120 defines a third end 126 and a fourth end 128. The first and third ends 122, 126 of the respective first and second arms 118, 120 are attached to the central body 114. In the illustrated embodiment, the first end 122 is connected at a first point of contact 130 defined on the central body 114 and the third end 126 is connected at a second point of contact 132 defined on the central body 114. It should be noted that the first and second points of contact 130, 132 are located at an upper portion 134 of the central body 114 with respect to a central axis (not shown) of the central body 114. In other words, the first and second points of contact 130, 132 are offset with respect to a center of the central body 114 and are located at the upper portion 134. Further, in the assembled condition of the mounting device 10, the second and fourth ends 124, 128 of the respective first and second arms 118, 120 are received on the ledge 58 (see FIG. 1) of the base 16 (see FIG. 4). More particularly, the second and fourth ends 124, 128 contact the ledge 58 of the base 16. The first and second arms 118, 120 are supported by the ledge 58. The resilient member 112 is therefore retained between the projection 82 and the ledge 58.

The first arm 118 defines two bends, namely a first bend 136 and a second bend 138. In an uncompressed or a normal state (shown in FIG. 10) of the resilient member 112, a first angle "B1" defined by the first bend 136 is different from a second angle "B2" defined by the second bend 138. Additionally, the second arm 120 defines two bends, namely a third bend 140 and a fourth bend 142. Further, in the uncompressed state of the resilient member 112, a third angle "B3" defined by the third bend 140 is different from a fourth angle "B4" defined by the fourth bend 142. In some examples, when the resilient member 112 is in the uncompressed state, the first angle "B1" defined by the first bend 136 is substantially equal to the third angle "B3" defined by the third bend 140. Further, in some examples, when the resilient member 112 is in the uncompressed state, the second angle "B2" defined by the second bend 138 is substantially equal to the fourth angle "B4" defined by the fourth bend 142. It should be further noted that the angles "A1", "A3" (see FIG. 6) defined by the respective first and third bends 104, 108 (see FIG. 6) of the first and third arms 88, 90 (see FIG. 6) of the resilient member 22 (see FIG. 6) are different from the angles "B1", "B3" defined by the first and third bends 136, 140 of the respective first and second arms 118, 120 of the resilient member 112. More particularly, the angles "A1", "A3" defined by the respective first and third bends 104, 108 of the first and third arms 88, 90 may be less than the angles "B1", "B3" defined by the first and third bends 136, 140 of the respective first and second arms 118, 120. The bends 136, 138, 140, 142 facilitate compression of the resilient member 112. More particularly, the bends 136, 138, 140, 142 allow smooth and easy transition of the cover 18 between the normal and loaded positions. Further, the bends 136, 138, 140, 142 may provide adequate support for the normal position even when the object 12 is applied on the support 72. Additionally, a distance "D2" is defined between the second point of contact 132 and the second end 128 of the resilient member 112. The distance "D2" is same as a distance defined between the first point of contact 130 and the first end 124 of the resilient member 112. In some cases, the predetermined threshold weight of the mounting device 10 may depend upon the distance "D2".

Further, as mentioned above, the predetermined weight threshold of the resilient member 112 is less than the predetermined weight threshold of the resilient member 22. This difference in the predetermined weight thresholds may be due to different geometries of the resilient members 22, 112. In some cases, the predetermined weight thresholds of the resilient member 22, 112 may depend on the distances "D1" and "D2", respectively. For example, the predetermined weight thresholds of the resilient members 22, 112 may be inversely proportional to the respective distances "D1", "D2". As the distance "D2" is greater than the distance "D1", the predetermined weight threshold of the resilient member 112 is less than the predetermined weight threshold of the resilient member 22. Accordingly, by varying the distances "D1", "D2", the predetermined weight thresholds of the respective resilient members 22, 112 may be varied.

Figure 11:
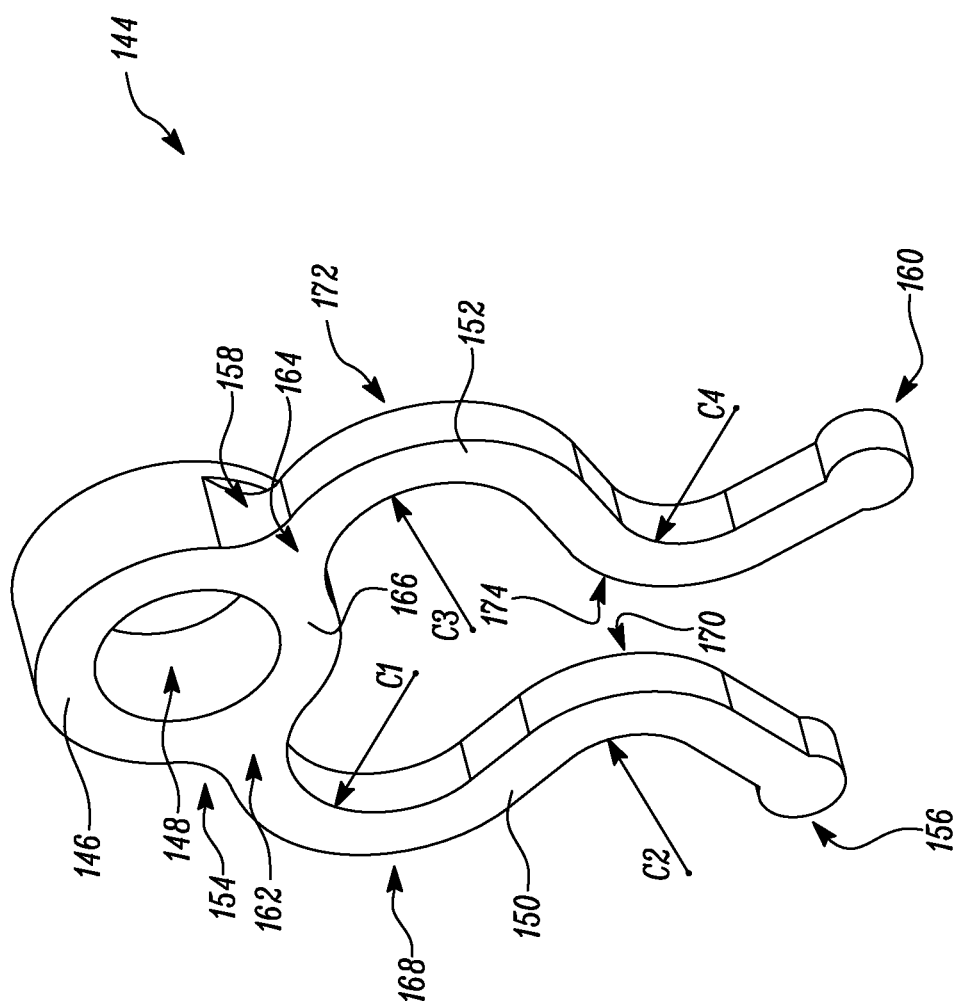
FIG. 11 illustrates a front view of another design of a resilient member associated with the mounting device of FIG. 1 according to one embodiment of the present disclosure.

FIG. 11 illustrates another design of the resilient member 144. The resilient member 144 is similar in operation to the resilient member 22 described in relation to FIG. 6. The resilient member 144 includes a central body 146 defining a hole 148. As illustrated, the central body 146 is embodied as an annular ring. In the assembled condition of the mounting device 10, the hole 148 is received within the projection 82 (see FIG. 4) of the cover 18 (see FIG. 4). In some embodiments, the central body 146 is received on the narrow portion of the projection 82. The wide portion of the projection 82 may secure the central body 146 on the projection 82. The resilient member 144 also includes a pair of arms, namely a first arm 150 and a second arm 152, extending from the central body 146. The first and second arms 150, 152 are compressed to move the cover 18 from the normal position when the weight applied on the support 72 (see FIG. 1) exceeds the predetermined weight threshold.

The first arm 150 defines a first end 154 and a second end 156. Further, the second arm 152 defines a third end 158 and a fourth end 160. The first and third ends 154, 158 of the respective first and second arms 150, 152 are attached to the central body 146. In the illustrated embodiment, the first end 154 is connected at a first point of contact 162 defined on the central body 146 and the third end 158 is connected at a second point of contact 164 defined on the central body 146. It should be noted that the first and second points of contact 162, 164 are located at a lower portion 166 of the central body 146 with respect to a central axis (not shown) of the central body 146. In other words, the first and second points of contact 162, 164 are offset with respect to a center of the central body 146 and are disposed at the lower portion 166. Further, in the assembled condition of the mounting device 10, the second and fourth ends 156, 160 of the respective first and second arms 150, 152 are received on the ledge 58 (see FIG. 1) of the base 16 (see FIG. 4). More particularly, the second and fourth ends 156, 160 contact the ledge 58 of the base 16. The first and second arms 150, 152 are supported by the ledge 58. The resilient member 144 is therefore retained between the projection 82 and the ledge 58.

The first arm 150 defines two bends, namely a first bend 168 and a second bend 170. In an uncompressed or a normal state of the resilient member 144 (shown in FIG. 11), a first radius "R1" defined by the first bend 168 is different from a second radius "R2" defined by the second bend 170. Further, the second arm 152 defines two bends, namely a third bend 172 and a fourth bend 174. In the uncompressed state of the resilient member 144, a third radius "R3" defined by the third bend 172 is different from a fourth radius "R4" defined by the fourth bend 174. In some examples, when the resilient member 144 is in the uncompressed state, the first radius "R1" defined by the first bend 168 is substantially equal to the third radius "R3" defined by the third bend 172. Further, in some examples, when the resilient member 144 is in the uncompressed state, the second radius "R2" defined by the second bend 170 is substantially equal to the fourth radius "R4" defined by the fourth bend 174. The bends 168, 170, 172, 174 facilitate compression of the resilient member 144. More particularly, the bends 168, 170, 172, 174 allow smooth and easy transition of the cover 18 between the normal and loaded positions. Further, the bends 168, 170, 172, 174 may provide adequate support for the normal position even when the object 12 is applied on the support 72.

The resilient member 22 (see FIGS. 1 and 6), the resilient member 112 (see FIG. 10), and the resilient member 144 may be an elastic component or a spring made of a suitable material, for example, plastic, metal, composite, and so forth. For example, for high load applications, the resilient member 22, 112, 144 may be made of polypropylene whereas for low load applications, the resilient member 22, 112, 144 may be made from acrylonitrile butadiene styrene (ABS). A geometry, dimensions such as thicknesses, or material of the resilient member 22, 112, 144 may be varied to adjust a resistance provided by the resilient member 22, 112, 144. For example, the resilient member 22, 112, 144 may be chosen based on the predetermined weight threshold.

Figure 12:
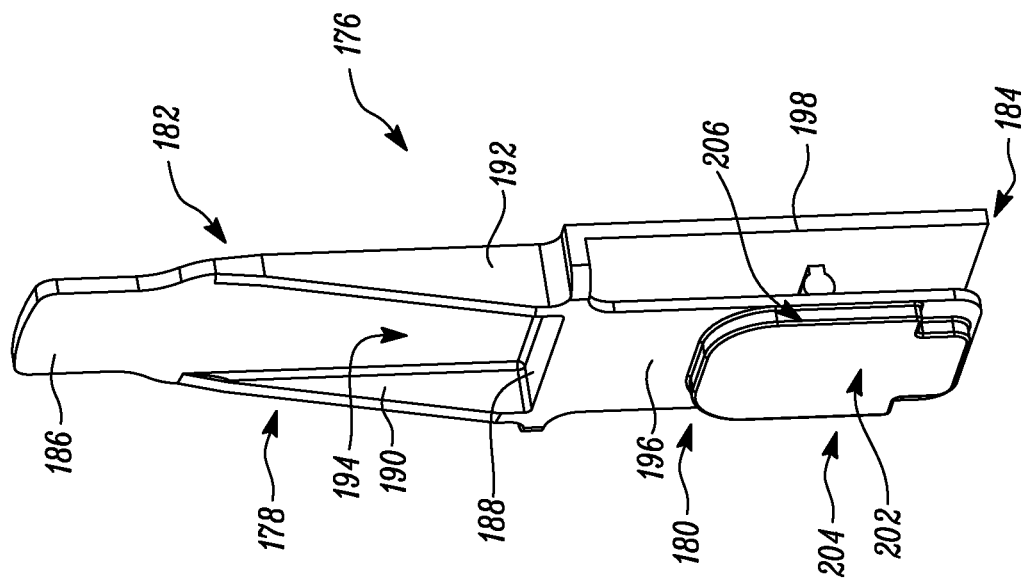
FIG. 12 is a front perspective view of another design of a base associated with the mounting device of FIG. 1 according to one embodiment of the present disclosure.

FIG. 12 illustrates another embodiment of the base 176. In this embodiment, the base 176 includes an upper portion 178 and a lower portion 180. The upper portion 178 defines an upper end 182 and the lower portion 180 defines a lower end 184. As shown, an indicator 186 extends from the upper end 182 of the base 176. The indicator 186 is similar to the indicator 60 explained in relation to FIG. 1. The upper portion 178 includes a ledge 188 and a pair of wedge-shaped arms 190, 192 that together define a receiving area 194. In the assembled condition of the mounting device 10, the receiving area 194 receives the resilient member 22, 112, 144 (see FIGS. 1, 10, and 11). It should be noted that dimensions of the receiving area 194 are decided such that the receiving area 194 can accommodate the resilient member 22, 112, 144 in both the uncompressed and compressed states.

Further, the lower portion 180 of the base 176 includes a first plate 196 and a second plate 198 that is spaced apart from the second plate 196. The third and second plates 196, 198 extend vertically below the ledge 188. The base 176 includes a connecting portion 202 disposed proximate to the lower end 184 of the base 176. The connecting portion 202 is coupled to the first plate 196 of the lower portion 180. The connecting portion 202 defines a first rib 204 and a second rib 206. The first and second ribs 204, 206 are slidably received within the first and second channels 76, 78 (see FIG. 4) of the cover 18 (see FIG. 4) for movably connecting the base 176 with the cover 18.

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A mounting device for supporting an object from a substrate, the mounting device comprising:
    a base attachable to the substrate and defining an upper end and a lower end, the base comprising an indicator at the upper end;
    a cover movably connected to the base, the cover comprising a support for supporting the object, wherein the cover covers the indicator of the base at a normal position with respect to the base, wherein the cover includes a pair of channels, and wherein the base further comprises a connecting portion disposed proximate to the lower end and adapted to be slidably received within the pair of channels of the cover; and
    a resilient member disposed between the base and the cover, wherein the resilient member is adapted to retain the cover at the normal position up to a predetermined weight threshold applied on the support,
    wherein the cover moves from the normal position to at least partially expose the indicator when a weight applied on the support exceeds the predetermined weight threshold.

2. The mounting device of claim 1, further comprising an adhesive strip adapted to attach the base to the substrate.

3. The mounting device of claim 1, wherein the cover further comprises an opening adjacent to the support.

4. The mounting device of claim 1, wherein the indicator is integral with the base and includes a surface having an appearance distinct from the cover.

5. The mounting device of claim 1, wherein the cover further comprises a recess at an upper end of the cover, the recess adapted to receive the indicator therethrough.

6. The mounting device of claim 1, wherein the resilient member further comprises:
    a central body defining a hole therethrough, the hole adapted to at least partially receive a projection of the cover; and
    a pair of arms extending from the central body, wherein an end of each of the pair of arms is received on a ledge of the base.

7. The mounting device of claim 6, wherein each of the pair of arms is compressed to move the cover from the normal position when the weight applied on the support exceeds the predetermined weight threshold.

8. The mounting device of claim 6, wherein each of the pair of arms comprises two bends.

9. The mounting device of claim 1, wherein the resilient member is adapted to move the cover back to the normal position when an excess weight applied on the support is removed.

10. A method of supporting an object from a substrate, the method comprising:

providing a mounting device including a base, a cover movably connected to the base, and a resilient member disposed between the base and the cover, wherein:

the base defines an upper end and a lower end, the base comprising an indicator at the upper end, wherein a connecting portion of the base is slidably received within a pair of channels of the cover;

the cover covers the indicator at a normal position with respect to the base; and the resilient member is adapted to retain the cover at the normal position up to a predetermined weight threshold applied on a support projecting outwards from the cover;

attaching the base to the substrate; and supporting the object on the support, wherein the cover moves from the normal position to at least partially expose the indicator when a weight applied on the support exceeds the predetermined weight threshold, at least partial exposure of the indicator being indicative of the object being too heavy for a recommended use of the mounting device.

11. The method of claim 10, wherein the mounting device further comprises:

a projection of the cover at least partially received in a hole of the resilient member; and a pair of arms of the resilient member received on a ledge of the base.

12. The method of claim 10, further comprising, in response to an indication of excess weight, reducing the weight applied on the support such that the cover moves back to the normal position and covers the indicator of the base.

13. The method of claim 10, wherein the indicator is integral with the base and includes a surface having an appearance distinct from the cover.

14. A mounting device for supporting an object from a substrate, the mounting device comprising:

a base defining an upper end and a lower end, the base comprising an indicator at the upper end;

an adhesive strip adapted to attach the base to the substrate;

a cover movably connected to the base, the cover comprising a support for supporting the object, wherein the cover covers the indicator of the base at a normal position with respect to the base, wherein the cover includes a pair of channels, and wherein the base further comprises a connecting portion disposed proximate to the lower end and adapted to be slidably received within the pair of channels of the cover; and a resilient member disposed between the base and the cover, wherein the resilient member is adapted to retain the cover at the normal position up to a predetermined weight threshold applied on the support, and wherein the resilient member is compressed to move the cover from the normal position when a weight applied on the support exceeds the predetermined weight threshold, the indicator being at least partially exposed upon movement of the cover from the normal position.

15. The mounting device of claim 14, wherein the indicator is integral with the base and includes a surface having an appearance distinct from the cover.

16. The mounting device of claim 14, wherein the cover further comprises a recess at an upper end of the cover, the recess adapted to receive the indicator therethrough.

17. The mounting device of claim 14, wherein the resilient member further comprises:

a central body defining a hole therethrough, the hole adapted to at least partially receive a projection of the cover; and a pair of arms extending from the central body, wherein an end of each of the pair of arms is received on a ledge of the base, wherein each of the pair of arms is compressed to move the cover from the normal position when the weight applied on the support exceeds the predetermined weight threshold, and wherein the resilient member is adapted to move the cover back to the normal position when an excess weight applied on the support is removed.

* * * * *